UNITED STATES PATENT OFFICE.

EDWARD GOODRICH ACHESON, OF STAMFORD TOWNSHIP, ONTARIO, CANADA, ASSIGNOR TO WILLIAM ACHESON SMITH, OF NIAGARA FALLS, NEW YORK.

REFRACTORY MATERIAL AND METHOD OF MAKING THE SAME.

No. 836,354.   Specification of Letters Patent.   Patented Nov. 20, 1906.

Application filed September 23, 1905. Serial No. 279,856.

*To all whom it may concern:*

Be it known that I, EDWARD GOODRICH ACHESON, a citizen of the United States, residing in Stamford township, Ontario, Canada, have invented certain new and useful Improvements in Refractory Material and Methods of Making the Same, of which the following is a specification.

The object of my invention is to provide a refractory material suitable for use as a lining for furnaces or converters or as a material for fire-bricks, crucibles, muffles, retorts, twyers, &c.

The invention consists in a material and a method of making the same, consisting, essentially, of a mixture of a compound of silicon, carbon, and oxygen, and an oxidizing agent.

In manufacturing fire-bricks by molding a moistened mass of finely-divided siloxicon, which is a compound of silicon, carbon, and oxygen, and firing to develop the self-bonding property, as disclosed in my Patent No. 722,793, of March 17, 1903, I have noticed that when the bricks are heated in an oxidizing atmosphere the surface is harder and tougher than the interior. I therefore concluded that the action of oxygen increases the self-bonding property. The present invention is based on this observation, that the self-bonding property of silicon, carbon, and oxygen is increased by the action of oxygen.

In carrying out my present invention and producing the refractory material I mix the compound of silicon, carbon, and oxygen with a substance which under the influence of heat is capable of acting as an oxidizing agent.

In order to effect a thorough bonding of the component particles of the mass, the compound of silicon, carbon, and oxygen is finely divided and is mixed with a small amount of an oxidizing agent. It is desirable in practice that this substance should not liberate its oxygen at a low temperature, as the desirable oxidizing effect is produced only at a comparatively high temperature. The substance to be added to the compound is preferably a metallic oxid—such as oxid of manganese, iron, or chromium—good results having been produced by the use of dioxid of manganese. Compounds of silicon, carbon, and oxygen—as, for instance, siloxicon as commercially produced—usually contain a small percentage of free carbon, and I have found that the presence of this free carbon is not detrimental to the self-bonding property.

In practice a satisfactory refractory material may be produced by employing ninety-two parts, by weight, of the compound of silicon, carbon, and oxygen—as, for instance, siloxicon—one part of manganese dioxid, and seven parts of carbon. These constituents are preferably finely divided and intimately mixed. When the material is to be used for the various purposes for which it is intended, a sufficient amount of a liquid—such as water, petroleum, or glycerin, or a viscous one, such as water and dextrin—is added to bring the mass into a plastic state, after which it is molded, dried, and fired at a temperature sufficient to give a satisfactory bonding action.

While it is to be understood that the precise nature of the effect produced by the oxidizing agent and the free carbon, when present, is not accurately known, the scope of this invention is independent of theory, as it has been found that the above materials furnish a mixture which is well adapted for the purposes intended.

What I claim is—

1. The herein-described method of producing refractory materials which when heated are self-bonding, which consists in mixing an oxidizing agent with a compound of silicon, carbon and oxygen.

2. The herein-described method of producing refractory materials which when heated are self-bonding, which consists in mixing an oxidizing agent with a compound of silicon, carbon and oxygen and free carbon.

3. A self-bonding material containing a compound of silicon, carbon and oxygen, and an oxidizing agent.

4. A self-bonding material containing a compound of silicon, carbon and oxygen, an oxidizing agent, and free carbon.

5. A self-bonding material containing a compound of silicon, carbon and oxygen, and a metallic oxid.

6. A self-bonding material containing a compound of silicon, carbon and oxygen, a metallic oxid, and free carbon.

In testimony whereof I affix my signature in presence of two witnesses.

EDWARD GOODRICH ACHESON.

Witnesses:
EUGENE A. BYRNES,
F. L. FREEMAN.